United States Patent
Doggen

(10) Patent No.: US 7,757,206 B2
(45) Date of Patent: Jul. 13, 2010

(54) METHOD, DESIGN PROGRAM AND EXECUTION PROGRAM FOR COMPOSING AND EXECUTING A COMPUTER APPLICATION, AS WELL AS A DATA CARRIER PROVIDED WITH A DESIGN PROGRAM AND A DATA CARRIER PROVIDED WITH AN EXECUTION PROGRAM

(75) Inventor: Jacobus Adrianus Anna Antonius Doggen, Echt (NL)

(73) Assignee: J.A.A.A. Doggen Beheer B.V., Mulderstraat (NL)

( * ) Notice: Subject to any disclaimer, the term of this patent is extended or adjusted under 35 U.S.C. 154(b) by 547 days.

(21) Appl. No.: 10/961,830

(22) Filed: Oct. 7, 2004

(65) Prior Publication Data

US 2005/0268278 A1    Dec. 1, 2005

(51) Int. Cl.
G06F 9/44    (2006.01)

(52) U.S. Cl. ............... 717/106; 717/107; 717/109; 717/112; 717/113

(58) Field of Classification Search ............... 717/106, 717/107, 109, 112, 113
See application file for complete search history.

(56) References Cited

U.S. PATENT DOCUMENTS

| | | | | |
|---|---|---|---|---|
| 5,159,687 | A * | 10/1992 | Richburg ............... | 717/106 |
| 5,237,688 | A * | 8/1993 | Calvert et al. ........... | 717/121 |
| 5,381,534 | A * | 1/1995 | Shi ...................... | 709/203 |
| 5,815,717 | A * | 9/1998 | Stack ................... | 717/105 |
| 6,311,323 | B1 * | 10/2001 | Shulman et al. .......... | 717/111 |
| 6,738,964 | B1 * | 5/2004 | Zink et al. ............. | 717/105 |
| 6,996,801 | B2 * | 2/2006 | Yoneyama ............... | 717/107 |
| 7,076,784 | B1 * | 7/2006 | Russell et al. .......... | 719/315 |
| 7,133,874 | B2 * | 11/2006 | Hill et al. ............. | 717/120 |
| 7,168,062 | B1 * | 1/2007 | Schmitter .............. | 717/110 |
| 2002/0059314 | A1 | 5/2002 | Yoneyama .............. | 707/200 |

FOREIGN PATENT DOCUMENTS

| | | |
|---|---|---|
| EP | 0 049 176 A1 | 4/1982 |
| EP | 0 320 818 A2 | 6/1989 |
| EP | 0 343 682 B1 | 11/1989 |
| WO | 01/59662 A2 | 8/2001 |

OTHER PUBLICATIONS

Cheng, J. "A Reusability-Based Software Development Environment", 1994, ACM SIGSOFT, pp. 57-62.*
Ravichandran, T. "Special Issue on Component-Based Software Development", 2003, The DATA BASE for Advances in Information Systems, pg. 45-46.*
Lubars, M.D., "The IDeA Design Environment," 11th International Conference on Software Engineering, pp. 23-32 (May 1989).

* cited by examiner

Primary Examiner—Wei Y Zhen
Assistant Examiner—Qamrun Nahar
(74) Attorney, Agent, or Firm—Ladas & Parry, LLP

(57) ABSTRACT

The invention relates to a method for composing and executing a computer application, wherein design software and execution software are available to a user via a computer. The method comprises the steps of the user making available information about the computer application to the design software, the design software composing an application structure on the basis of said information, and the execution software enabling the computer application to run on the basis of one or more basic functions available within the execution software in dependence on the composed application structure. The invention further relates to a design program, an execution program as well as to data carriers provided with said programs.

18 Claims, 3 Drawing Sheets

METHOD, DESIGN PROGRAM AND EXECUTION PROGRAM FOR COMPOSING AND EXECUTING A COMPUTER APPLICATION, AS WELL AS A DATA CARRIER PROVIDED WITH A DESIGN PROGRAM AND A DATA CARRIER PROVIDED WITH AN EXECUTION PROGRAM

TECHNICAL FIELD OF THE INVENTION

The invention relates to a method for composing and executing a computer application, wherein design software and execution software are available to a user via a computer.

The invention further relates to a design program, an execution program, as well as to data carriers comprising with a design program and/or an execution program for use in such a method.

BACKGROUND OF THE INVENTION

Since the advent of automation in industrial, bureaucratic and domestic processes, many computer applications for all kinds of uses and various systems have become commercially available.

Industrial applications are for example available for controlling machines in production processes, monitoring chemical processes, controlling surveillance systems for security applications, managing computer networks, providing information from (whether or not remote) data files, keeping all kinds of parameters up-to-date (such as billing systems in telecommunication networks), etc. Furthermore applications are available for all kinds of administrative activities, such as word processing, data processing, bookkeeping, graphic design, presentations, etc. In addition to that, many applications aimed at controlling and managing processes in the field of automation and telecommunication itself may be considered; think in this connection of the setting up of communication links of analog or digital networks, data compression, electronic communication and the like. Those skilled in the art will appreciate in the light of the above examples that the list of possible applications is by no means exhausted.

These applications are generally developed by software developers, employed by software producers. Many of these applications are however also developed by users themselves. Such applications are frequently based on existing applications or systems (Oracle®, Linux®, Microsoft Office®, etc), to which they add specific functionality that is important to the user. In some cases, however, it is necessary to develop custom-made software for specific applications.

Use may be made of developing environments (such as so-called "editor" and "compiler" applications) for developing such software, which environments provide a software developer with an extensive environment for developing computer applications. The developing environment e.g. provides extensive descriptions of available and usable commands in specific programming languages. Using this environment, the software developer can write a script or a source code in a specific programming language. Said script must subsequently be converted by means of a "compiler" into a code that can be directly read and executed by a machine.

The procedure to be followed has this drawback that it is rather laborious and that a large number of preparatory operations are required. This will be explained hereinafter by means of a description of the development of a computer application for, for example, executing a cash dispensing operation in an automatic teller machine.

First the software developer must make a general design, in which he/she must indicate the desired functionality, the required data and the manner in which said data are structured, the interaction with a user that must take place, etc. The software developer will set to work on the basis of this general design.

Before the actual programming is started, the data contained in a database must be suitably structured. In the present example, the software developer will have to make the data stored in data bases of various financial institutions available to the automatic teller machine, and he will have to indicate the manner in which said data must be structured for the teller machine, the relation between said data, etc. In this case said data comprises data on the financial institutions (such as the name of the institutions and data relating to the institution in interbank traffic), identification data of the user of the automatic teller machine (bank account number, PIN code (present on the cheque card), any other verification data), data on the user's bank account (balance, withdrawal limit), etc. Furthermore, data to be input by the user and other data, such as the amount to be withdrawn, the PIN code that has been entered, whether or not the user wishes to receive a receipt, the time and the location of the withdrawal, the banking institution responsible for the cash dispensing operation, etc, must be included in the data structure.

The structuring of the data may take place in various ways. As soon as the software developer knows how to structure the data, he/she must write a data script in which said data structure is laid down for the computer.

Subsequently the software developer needs to spend time on the graphic user interface (GUI). To that end, a number of graphic display images must be designed, which will be shown to the user and in which the user can input information with regard to the user identification as well as information about the cash dispensing operation.

Furthermore a graphic/textual design of a receipt must be made, since the automatic teller machine must be capable of providing receipts at the user's request. In addition to that it may be desirable to design a number of "queries" in Standard Query Language (SQL) for retrieving information from the available data bases.

Once the software developer has completed all preparatory operations, he can start writing the script for the computer application itself. When doing so, he must indicate the sequence of the operations to be carried out by the computer application and the conditions on which said operations are carried out. Furthermore said script will contain a description of the precise operations that are to be carried out with the data, such as verifying the identity data, entering an amount of money (by the user), activating the money dispensing mechanism, printing of a receipt, refreshing the data in the database and waiting for a next client. Conditions that may be important for a correct proceeding of the procedure are, for example, the correct or incorrect entry of the identification data, the amount of the bank balance, the amount to be withdrawn, etc.

As soon as the script is complete, it is compiled or, in other words, converted into a code that can be read by the computer. Said code consists of a series of basic operations that can be carried out by the logic elements of which the computer is made.

After said compilation, the computer application is tested both as regards its functionality and as regards its technical aspects and subsequently adapted, if desired, on the basis of the test results. If the test results are satisfactory, the computer application is put into service. If the results are unsatisfactory, however, the developer will have to go through the developing process anew in whole or in part.

The composition of a computer application is therefore a very laborious activity. As a result, the developing process takes up a great deal of time and can only be carried out by specialised personnel (software developers) having a thorough knowledge of the systems for which the computer application is intended. It is not relevant in this connection whether the programming of automatic teller machines, the controlling of a production line in the factory, the consulting of databases in general or any other application is concerned. To a greater or lesser extent, the aforesaid operations will have to be carried out at all times.

SUMMARY OF THE INVENTION

It is an object of the present invention to provide a method for the automatic composition and execution of a computer application, with a short realisation time and without any specialized knowledge being required, by a central processing unit (CPU) of a computer.

This objective is in accordance with the present invention achieved by providing a method for composing and executing a computer application, wherein design software and execution software are available to a user via a computer, which method comprises the steps of the user making available information about the computer application to the design software, the design software composing an application structure on the basis of said information and the execution software enabling the computer application to run on the basis of one or more basic functions available within the execution software in dependence on the composed application structure.

With a method as described above, the user only needs to provide information about the desired application to the design software, on the basis of which information the design software can automatically compose an application structure. The information can be provided to the design software by the user at the user's own abstraction level. Conversion of the information input by the user into the application structure required for setting up an application can be realised in a straightforward manner by the design software, since the available functionality is established and the design software can gear the application structure thereto. As a result, the realisation of the application is not only much more user-friendly, but in addition the realisation time is strongly reduced. It suffices to present the information to the design software to develop a computer application, after which the application can be directly executed by means of the execution program on the basis of the application structure as automatically generated by the design software.

In a preferred embodiment of the invention, the computer application is arranged for interaction with a dataset, wherein the composition of the application structure by the design software comprises the steps of obtaining the information from a user, said information comprising properties of the computer application and of data contained in the dataset, defining the application structure on the basis of the obtained information for configuring the computer application and arranging the data from the dataset on the basis of the application structure for defining a data structure.

Since the execution software only enables a limited number of basic functions (which can of course be extended without limitation), and it is therefore known how and in what form the data for executing the basic functions for the execution program must be available, the user can be guided by the design software in configuring the computer application and possibly be steered in a specific direction. By arranging the design software so that it will obtain the information from the user, and consequently will play an active part in obtaining the information, the procedure can take place in a very efficient manner which is appreciated by the user.

Concretely, an application structure can be defined on the basis of the obtained information in that case, after which the data can be arranged on the basis of the obtained application structure for providing a data structure. It is noted in this connection that the data required for executing the computer application are divided into three "datasets": the application structure which comprises properties of the data relating to the computer application, such as connections between data, data subsets, data indexes, access rights to data and the like properties; the data structure in which the manner in which the data for executing the computer application are arranged and the manner in which the data are provided (format, prescribed syntax, type (such as boolean, number, date, text, etc.) are concretely indicated; and the data manually, which data comprise the raw data.

It is not necessary to define the basic functions manually, since they are already known in the execution software and can be freely selected by the user by means of the execution software during the execution of the obtained computer application.

In one embodiment of the invention, the obtaining of information takes place in that one or more question are submitted to the user on the basis of the dataset and in that the user provides one or more answers.

This interactive manner of obtaining information is very clear to the user and makes the development of computer applications accessible to experienced as well as to inexperienced users. Such a question/answer procedure is found to be easy by the user, since an extensive knowledge of the application environment is no longer required and the user can directly communicate the desired functionality to the computer.

In one embodiment of the invention, the basic functions are arranged for interaction with the data on the basis of the application structure. The basic functions may thus be arranged for reading, processing, inputting and/or refreshing the data, which may or may not take place in dependence on the already defined application structure and the data structure that is based thereon.

In one embodiment of the method according to the invention, the design software (in addition to the execution software) is arranged for enabling some or all of the available basic functions. This has the advantage that the computer application can already be executed within the design software to a certain extent while being composed, which results in a further efficiency improvement.

In another embodiment, the application structure is stored in an application structure database. In yet another embodiment, the data structure is stored in a data structure database. Those skilled in the art will appreciate that such a database can be made available to the execution software in a straightforward manner.

In yet another embodiment of the invention, the application structure database and the data structure database are combined into a development database. It is not necessary to maintain two separate databases for the application structure and the data structure. The combining of the required databases into a single database offers advantages, for example with regard to the required data storage capacity. Optionally, also the raw (not arranged) data can be stored as a database within such a development database.

In yet another embodiment, said development database is converted into an execution database prior to the execution step by the execution software.

If a new application is to be composed, wherein a new application structure and a new data structure are to be provided, the design software can generate a creation script for setting up a new execution database on the basis of the application structure composed of the information from the user and the data structure that is based thereon. Upon conversion of the development database into the new execution database, said script is used for generating the execution database as well. If an existing computer application (comprising an existing execution database) is adapted or amended, so that also the application structure and/or the data structure are amended, the design software can generate an amendment script for refreshing the existing execution database.

The advantage of maintaining an execution database and a development database is that although versions of the computer application can still be used whilst newer versions are already being developed. The fact is that the database need not be off-line in order to change application and data structures. For example, in the case of a computer program for controlling a production process in a factory, staff can thus continue to use the older version of the computer application, so that the production process need not be stopped. Also in office environments, for example, in which a computer application is used by several users for keeping an electronic archive, work can normally continue while the computer application is being amended.

In yet another preferred embodiment of the invention, execution of the computer application takes place in that the user communicates to the execution software what basic functions are desired for the execution, which functions have been selected from the available basic functions by the user.

The execution program may e.g. display a menu of available basic functions, such as displaying, amending, printing and/or storing data, sending data over a network or transferring data to a device. Programd data in a network management program may for example be sent to network management equipment. The user merely needs to communicate his selection to the execution software, and the execution software will perform the basic functions.

According to a second aspect of the invention, there is provided a design program which is arranged for receiving information over a computer application to be composed, producing an application structure on the basis of the information received, and storing the application structure for use thereof by an execution program for enabling the computer application to run on the basis of one or more basic functions in dependence on the application structure.

According to one embodiment of the design program, the design program may be arranged for obtaining the information from the user, which information comprises properties of the computer application and of data in a dataset, and which may be further arranged for defining the application structure on the basis of the obtained information for configuring the computer application and arranging the data from the dataset on the basis of the application structure for defining a data structure.

According to one embodiment, the design program may be arranged for presenting one or more questions regarding the computer application to be composed to the user on the basis of the dataset, wherein the design program is further arranged for processing one or more answers provided by the user by means of the interface.

According to a third aspect of the invention, there is provided an execution program which is arranged for enabling a computer application to run on the basis of unavailable application structure.

According to a fourth aspect of the invention, there is provided a data a carrier comprising a design program that is arranged for composing an application structure of a computer application on the basis of information on the computer application when the design program is loaded in the main memory of the computer.

According to a fifth aspect of the invention, there is provided a data carrier comprising an execution program arranged for enabling a computer application to run on the basis of an application structure when the execution program is loaded into the main memory of a computer.

BRIEF DESCRIPTION OF THE DRAWINGS

The invention will now be explained in more detail by means of a description of a few specific, non-limitative embodiments thereof, in which reference is made to the appended drawings and the reference numerals therein, in which drawings.

DETAILED DESCRIPTION OF THE DRAWINGS

Figure 1:
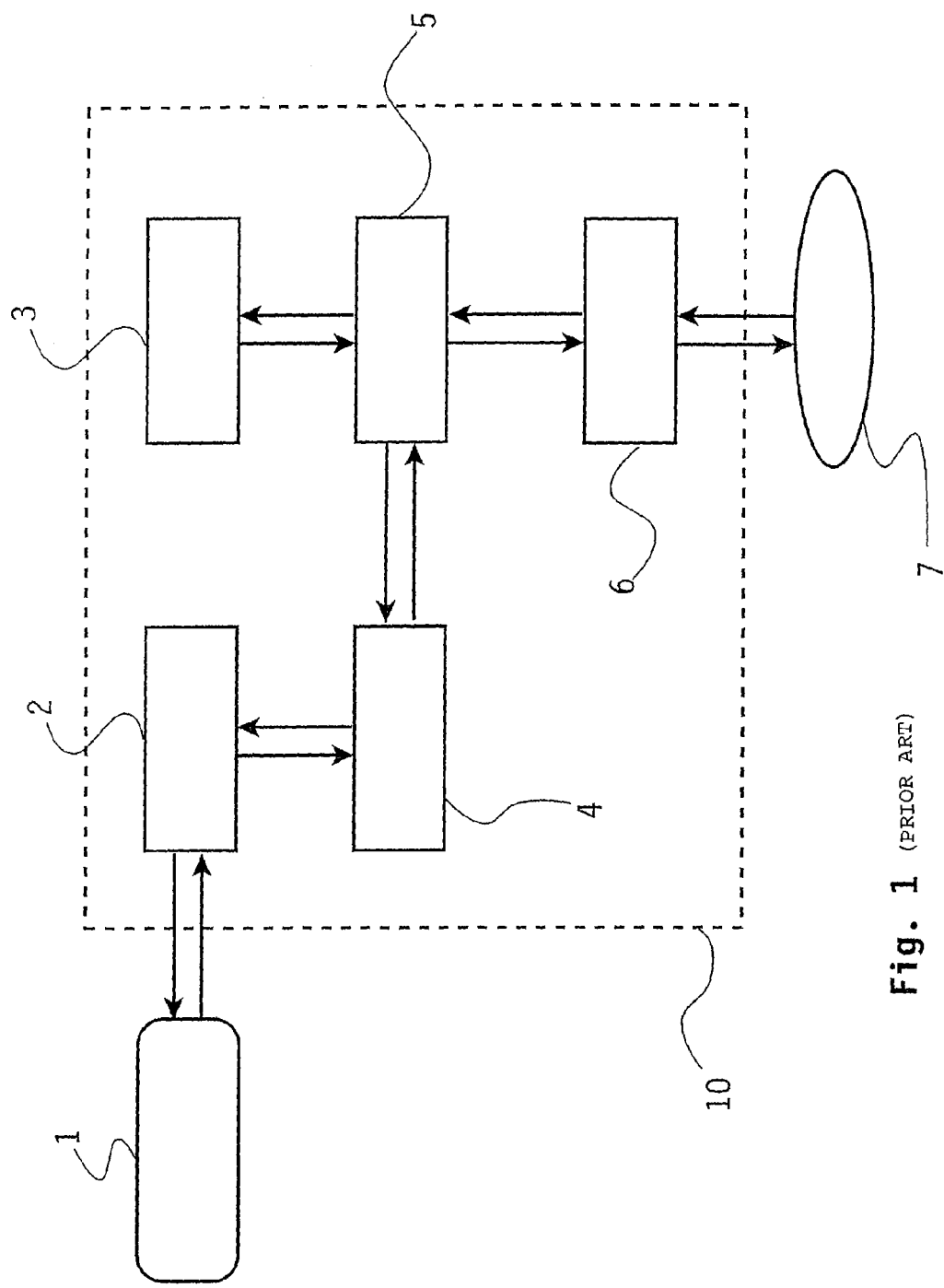
FIG. 1 is a schematic representation of a computer application according to the prior art.

FIG. 1 is a schematic representation of a prior art computer application. The computer application as shown is aimed at having a process 1, e.g. a production process or the controlling of a machine, take place by addressing and adapting a number of data contained in a data file 2. The computer application is controlled by a user 7, who can interact with the computer application 10 via a graphic user interface 6. The computer application comprises an application structure 5, which comprises the sequence of the operations to be carried out and the terms on which said operations are to be carried out. The execution of the operations to be carried out takes place by means of processor commands 3 sent to the central processing unit (not shown) of a computer.

The data 2 have a specific data structure 4. Said data structure indicates the manner in which certain data are interrelated, in what form they are available, how much memory each datum requires, etc, and said data structure 4 can be communicated to the computer by means of a script, for example.

Schematically shown, an interaction between the application structure 5 and the data structure 4 occurs at the level of the application structure 5 and the data structure 4, which interaction is based on the underlying processor commands 3, in such a manner that the data 2 can be read, processed and written to disk. The process 1 can be controlled by processing the data 2.

Concretely in this connection, one can for example consider the reading and possible amendment of the operation parameters in a production process, for example the speed of a production line, the supply of auxiliary materials, etc. In this case said data can be addressed separately; in addition to that there is a certain connection between the data in some cases. It will be apparent, for example, that if the speed of the production line in a production process is increased, the supply of auxiliary materials will probably have to be increased as well. There is a connection, therefore, between the production line speed and the supply of auxiliary materials.

The application structure 5 as mentioned above in fact determines what operations are to be carried out at what point in time. Said operations will have to be converted into processor commands 3, which can be executed directly by, for example, the central processing unit in the computer. A concrete example of this is e.g. the adaptation of a value (for example the production line speed) in a production process. To adapt the production line speed, the storage location of the datum in question must first be found, then a new value must be written to said storage location. These two operations must be converted into processor commands, which can be executed by the central processing unit. Thus the retrieval of the datum from the memory may take place by reading a value from a table in the random access memory (RAM), for example, and in order to change said value at said storage location, this new value must be written to said storage location. The reading of a value from a table and the writing of a value to a storage location are commands which can be directly understood by the central processing unit.

Upon developing such a computer application 10, both the data structure 4 and the application structure 5 must be realised by means of a script by a software developer. Also the graphic user interface must be realised separately. All this must subsequently be compiled (converted into commands that can be understood by the central processing unit), followed by extensive testing. After that, the script will be amended again, etc.

Figure 2:
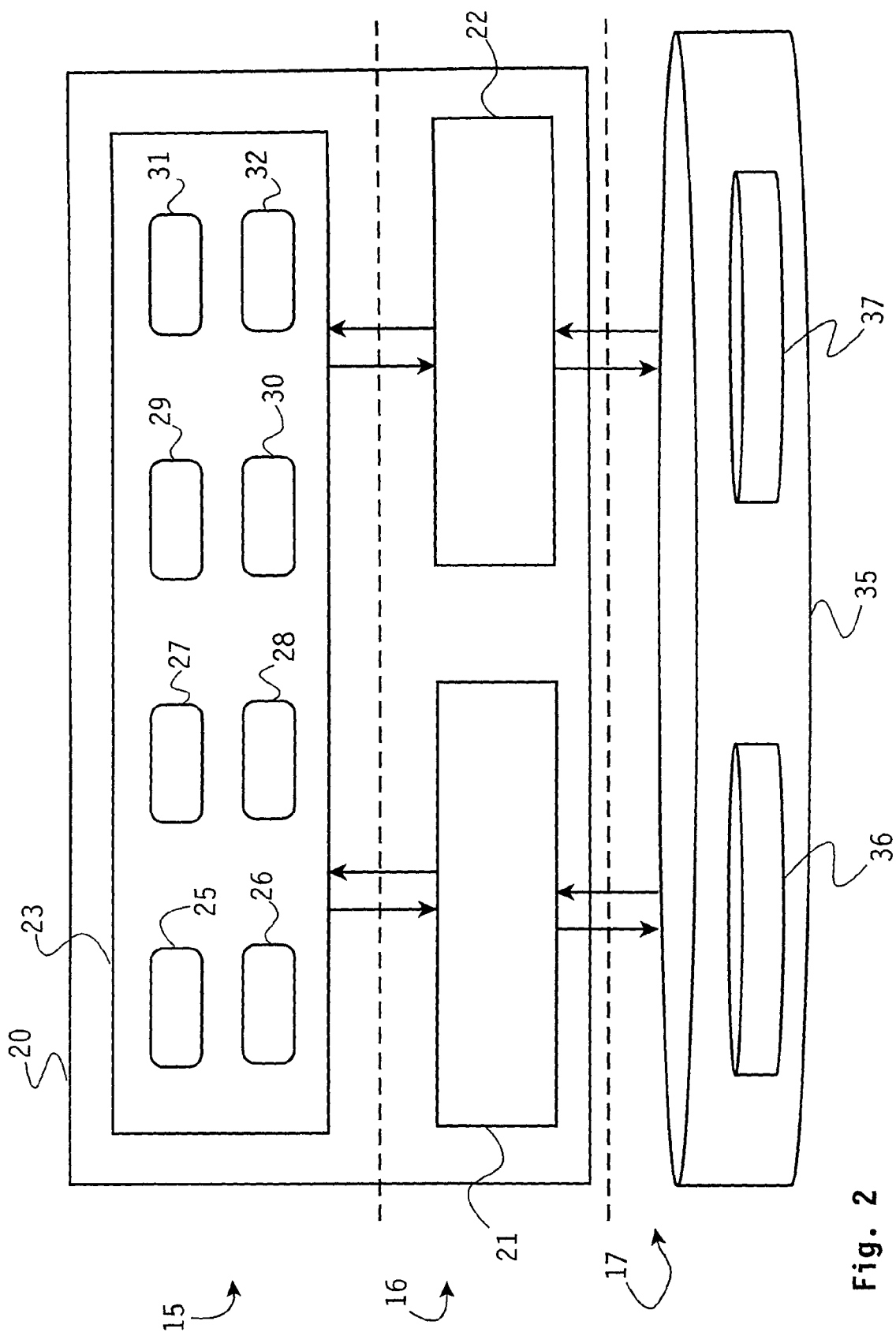
FIG. 2 is a schematic representation of design and execution software according to the invention.

FIG. 2 shows the design and execution software 20 according to the invention. In FIG. 2, three layers 15, 16 and 17 are schematically indicated. The function layer 15 represents the functionality for creating the computer applications. The operation layer 16 provides the graphic user interfaces and the design and execution software. The data layer 17 comprises the data required for executing the application. Said three layers will be discussed in more detail below.

The function layer 15 comprises a set 23 of basic functions 25, 26, 27, 28, 29, 30 and 32, which together form the required functionality for enabling the computer application to run. Said basic functions 25, 26, 27, 28, 29, 30 and 32 are e.g. operations such as the opening of a display image, the printing of a file, the characteristics and required information regarding the data objects, etc. Said functionality can be used by the design software 21 and the execution software 22 in the operation layer for creating and executing the desired computer application. The design software 21, the execution software 22 and the functionality 23 together form a design (21) and execution (22) environment, which in itself can in turn be made available as a separate application. It should be understood that the design software 21 and the execution software 22 can also be used independently of each other, of course. This makes it possible to create a computer application independently of the execution software 22 by means of the design software 21, and equivalent thereto to use said computer application independently of the design software 21, e.g. at a later stage, by means of the execution software 22.

The design software 21 is arranged for composing an application structure, which includes all the data required for executing the basic functions (25, 26, 27, 28, 29, 30 and 32), by means of information (not shown) that is provided via input by a user. Since the basic functions are as standard available to the design and execution environment, and since the user only needs to make a selection from the available basic functions (25, 26, 27, 28, 29, 30 and 32) during the execution of his computer application, the application structure comprises all the information that is required for enabling the computer application to run (based on the execution program 22). The application structure can be written to an application structure database 37. Furthermore it may be necessary to arrange the data on the basis of the application structure. Based on the application structure, the design program 21 can arrange the data (not shown) and provide a data structure that can be written to a data structure database 36. In addition to that, the raw data can be stored in a database (not shown). It should be understood that the data structure database 36, the application structure database 37 and possibly the database containing raw data (not shown) may be integrated in a common database 35.

The provision of information by the user to the design software 21 may take place at the user's initiative, but it may also take place in an interactive manner, for example in the form of question/answer dialogue (wizard), under the guidance of the design software 21. Since the available functionality as present in the set of basic functions 23 is known to the design program 21, the design program 21 can ask the user specific questions, which make it possible to compose the application structure automatically on the basis of the answers to said questions and, on the basis thereof, compose the data structure and store it in the application structure database 37 and the data structure database 36. The raw data may be stored in a database (not shown).

If the required data, the data structure and the application structure are known and are stored in the databases intended for that purpose (such as the databases 36 and 37), possibly integrated in a common database 35, the data are made available to the execution software 22. The execution software 22 may be started at the user's initiative. The execution software 22 is arranged for enabling the computer application that is desired by the user to run on the basis of the available functionality in the set of basic functions 23, on the basis of the application structure in the application structure database 37 and the data structure in the data structure database 36, and e.g. display, process, store or print the data or make them available to equipment, etc.

It should be understood that it may be advantageous to make prior versions of the database 35 (or the separate databases 36 and 37) available. Thus the making available of a development database and an execution database may be considered. This principle works as follows. When a computer application is first composed by means of the design software 21, the design software 21 can generate a creation script on the basis of the available application structure, the data structure and the data, by means of which script the execution database can be composed. The creation script for example indicates the manner in which data are structured, the form in which are present and the connections between the various data. Subsequently the development database is converted on the basis of the creation script into the execution database to be created for use by the execution program.

If an execution database already exists, e.g. because an existing computer application is to be adapted or revised by means of the design software 21, the design software 21 may produce amendment scripts on the basis of the existing database rather than generate a creation script, which amendment scripts only indicate how the data available in the execution database, the data structures and the application structures must be adapted to the new situation. The amendment scripts can be used for updating the existing execution database.

Figure 3:
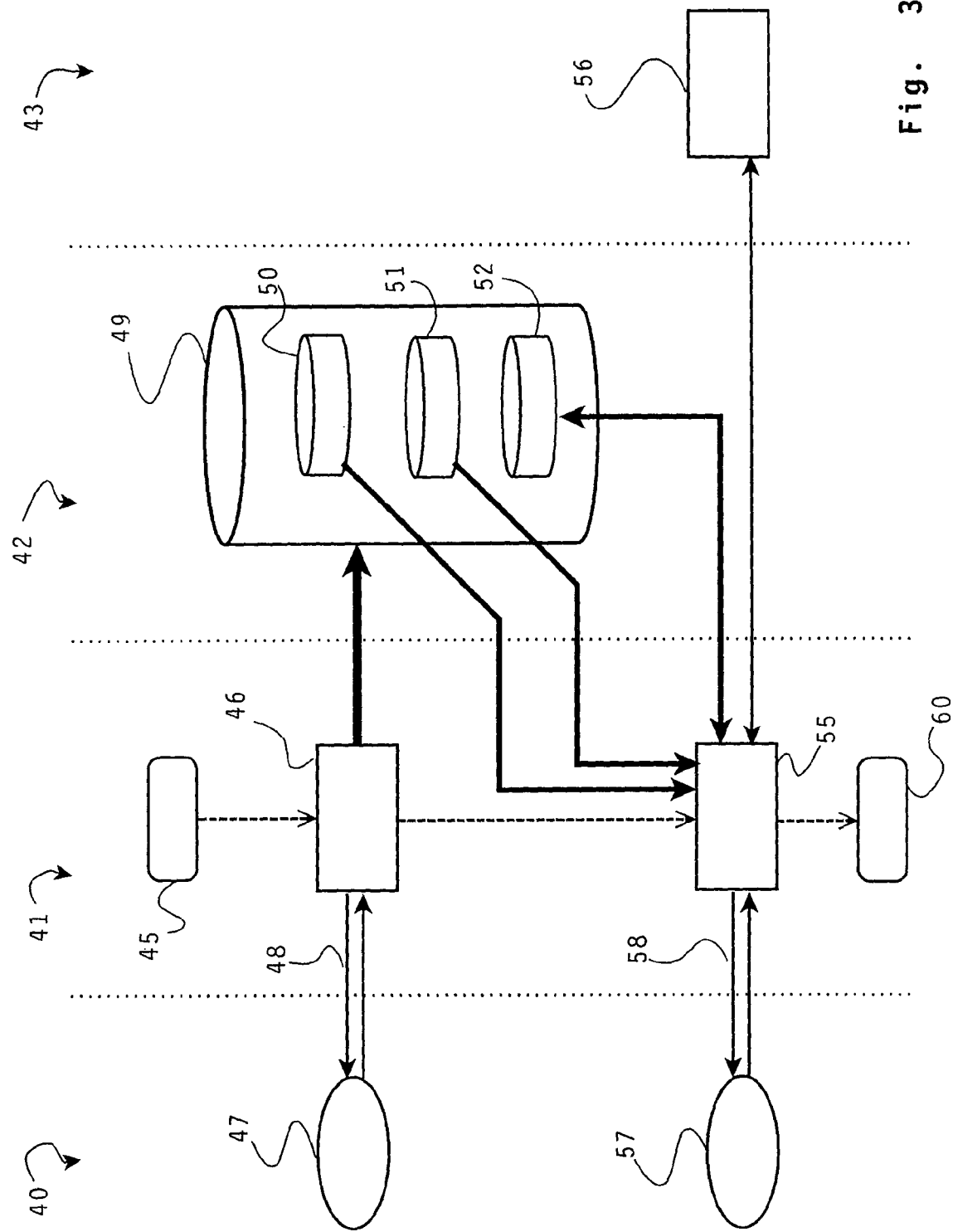
FIG. 3 is a schematic representation of a method according to the invention.

FIG. 3 shows a method according to the invention. FIG. 3 shows four columns separated by dotted lines. The first column 40 corresponds to the information exchange between the user and the design and execution software. The second column 41 shows the sequence in which the various parts of the design environment are used for creating the computer application. The third column 42 shows the development database/execution database that is composed and used by the design and execution software. The fourth column 43 shows the available functionality in the design and execution software.

At the start 45 of the method, the design phase 46 is started, in which a user provides information 47 to the design software 46. The provision of information 47 to the design software 46 may take place at the user's initiative, but preferably it takes place under the guidance of an interactive process 48 by the design software 46. The design software 46 is capable of guiding this process in an interactive manner, because the available functionality 56 is known to the design software 46 and because it is also known what information is needed for using the available functionality 56.

Based on the obtained information 47, the design software 46 provides an application structure 50 and, on the basis of said application structure, a data structure 51, which structures are stored in a database 49, for example, possibly together with the data 52 to which the data structure 51 relates. The assembly of the application structure 50 may take place during the interactive process, in which the design software 46 obtains information 47 from the user by means of a question/answer procedure 48. Following that, the design program 46 can define a data structure 51 on the basis of the application structure 15 by arranging the available data, for example in tables. The data structure 51 may comprise further properties of the data, such as the format and the type of data, or the (maximum and/or minimum) length of each datum.

As soon as the design phase has been completed, the method proceeds with the execution phase. The execution program 55 reads the application structure 50 and the data structure 51 from the database 49 and enables the execution of certain operations on the basis of basic functions selected by a user from the available functionality 56. The data 52 may be made available (57) to the user, e.g. by means of a graphical user interface 58 that is integrated in the execution program 55, who may subsequently adapt the data, for example. Said amendments can be stored in the database 52. A large number of other basic functions beside the displaying and/or processing of data are possible, of course, as will be discussed hereinafter. If the user wishes to end the application after some time, the execution program 55 can be closed and the method is terminated (60).

The available basic functions will have to be available to the execution software in any case, since the execution software needs said basic functions for executing the computer application. In the execution program, the user can freely select the basic functions at any desired moment. Basic functions that may belong to the available functionality 56, for example, displaying images, providing information, executing a dialogue or wizard to execute the computer application, displaying diagrams, tables, etc., inputting data (by a user), processing data, printing data on a printer, setting up communication lines were via networks, controlling analog or digital processes on the basis of said the data, such as controlling machines or managing digital networks, etc.

On the other hand, said basic functions may also be present in the design software in whole or in part, so that certain basic functions can be executed during the design phase already, for example.

The embodiments as shown in the figures are only meant to illustrate the methods and software of the invention as described herein. The context of the invention as described herein is only limited by the appended claims. It will be understood that the embodiments as shown and described herein are not intended to limit the invention in any way.

The invention claimed is:

1. A computer-implemented method for composing and executing one or more computer applications arranged for interaction with a database, the method comprising:
   wherein the interaction of the database is by means of a design software and an execution software such that one or more data processing and interaction functions are exclusively available to said design software and said execution software;
   using said design software to generate an application structure for one or more computer applications based on an information obtained from a user, wherein said application structure generated by said design software is geared to functionality provided by said exclusively available one or more data processing and interaction functions, wherein the information obtained from the user includes properties of the one or more computer applications and of data contained in the database, and wherein obtaining the information from the user comprises:
      providing to the user one or more questions based on the database and the functionality provided by the one or more data processing and interaction functions and receiving one or more answers from said user; and
   using said execution software to execute the one or more computer applications based on only the generated application structure and the exclusively available one or more data processing and interaction functions.

2. The computer-implemented method according to claim 1, wherein the one or more computer applications are arranged for interaction with a database, wherein the generating the application structure by the design software comprises:
   obtaining the information from a user, said information comprising properties of the one or more computer applications and of data contained in the database;
   defining the application structure on the basis of the obtained information for configuring the one or more computer applications; and
   arranging the data from the database on the basis of the application structure for defining a data structure.

3. The computer-implemented method according to claim 2, wherein the data structure is stored in a data structure database.

4. The computer-implemented method according to claim 3, wherein the application structure is stored in an application structure database, wherein the application structure database and the data structure database are combined into a development database.

5. The computer-implemented method according to claim 4, wherein said development database is converted into an execution database prior to the execution step by the execution software.

6. The computer-implemented method according to claim 5, wherein a script is composed for converting the development database into the execution database, on the basis of which script said conversion takes place.

7. The computer-implemented method according to claim 1, wherein the one or more computer applications are arranged for interaction with data of a database, wherein the data processing and interaction functions are arranged for interacting with the data on the basis of the application structure.

8. The computer-implemented method according to claim 1, wherein the design software is arranged for enabling at least one of the available data processing and interaction functions or every one of said data processing and interaction functions.

9. The computer-implemented method according to claim 1, wherein the one or more computer applications are arranged for interaction with data of a database, wherein the application structure comprises properties of the data relating to the one or more computer applications, such as relations between data, data subsets, data indexes, and access rights to data.

10. The computer-implemented method according to claim 1, wherein the application structure is stored in an application structure database.

11. The computer-implemented method according to claim 1, wherein execution of the one or more computer applications takes place in that the user communicates to the execution software what basic functions are desired for the execution, which functions have been selected from the available basic functions by the user.

12. The computer readable storage medium adapted for use in the computer-implemented method according to claim 1, which program is arranged for receiving information over the one or more computer applications to be composed, producing the application structure on the basis of the information received, and storing the application structure for use thereof by an execution program, wherein said design program is arranged for producing said application structure geared to functionality provided by one or more basic functions available in execution software, for enabling the one or more computer applications to run on the basis of said execution software.

13. The computer readable storage medium according to claim 12, which is arranged for obtaining the information from the user, which information comprises properties of said computer application and of data in a database, and which is further arranged for defining said application structure on the basis of the obtained information for configuring said computer application and arranging said data from the database on the basis of said application structure for defining a data structure.

14. The computer readable storage medium according to claim 13, which is arranged for presenting one or more questions regarding said computer application to be composed to the user on the basis of said database, wherein said design program is further arranged for processing one or more answers provided by the user.

15. A computer readable storage medium adapted for use in the computer-implemented method according to claim 1, wherein the execution program is arranged for enabling the one or more computer applications to run on the basis of the available application structure.

16. A computer readable storage medium adapted for use in the computer-implemented method according to claim 1, which is arranged for composing the application structure of the one or more computer applications on the basis of information on the computer application when the design program is loaded in a memory of the computer.

17. A computer readable storage medium adapted for use in the computer-implemented method according to claim 1, which is arranged for enabling the one or more computer applications to run on the basis of the application structure when the execution program is loaded into a memory of the computer.

18. The computer-implemented method according to claim 1, wherein the one or more baste data processing and interaction functions provide functionality to enable the one or more computer applications to run.

* * * * *